United States Patent Office 3,792,029
Patented Feb. 12, 1974

3,792,029
PRODUCTION OF COPOLYMERS
Lubor Roubinek, London, and Theodore Roger Ernest Kressman, Watford, England, assignors to The Permutit Company Limited, London, England
No Drawing. Filed Mar. 8, 1971, Ser. No. 122,207
Claims priority, application Great Britain, Mar. 17, 1970, 12,849/70
Int. Cl. C08f 1/11
U.S. Cl. 260—88.2 C                      9 Claims

ABSTRACT OF THE DISCLOSURE

In the suspension polymerization of a mixture of two unequally reactive monomers, such as styrene and divinyl benzene, in a suspension medium containing a stabilizer which forms films on globules of the monomer mixture, the proportion of the more reactive monomer in the unreacted mixture in the globules tends to decrease continuously, so that the resultant beads are not homogeneous in composition. The invention improves the homogeneity by adding more monomer mixture in the form of an emulsion as the polymerization proceeds, the emulsion containing a progressively increasing proportion of the more reactive monomer. To enable the emulsified monomers to enter to globules, the stabilizer films are kept thin.

---

The suspension polymerization of a mixture of monomers to yield a copolymer in bead form is well known. It is employed extensively in the production of cross-linked copolymers to which ion-exchange properties are subsequently imparted. While the present invention is broadly concerned with the production of copolymer beads, it is particularly valuable in the production of beads which are subsequently to be used for ion-exchange purposes, and the problem which it solves can most conveniently be explained by reference to such beads.

Modern ion-exchange resins are normally produced in bead form by suspension polymerization and are usually copolymers of styrene and divinyl benzene or other cross-linking agent. It is known that these cross-linking agents, presumably owing to their greater reactivity and to the fact that they contain two or more polymerizable double bonds, generally react more readily than the styrene with its single polymerizable double bond. The result is that, at the start of the polymerization, the concentration of the cross-linking agent in the polymer molecule is relatively high, the proportion of the cross-linking agent that enters the polymer molecule being greater than that in the initial mixture of monomers. The proportion in the mixture gradually decreases until, towards the end of the polymerization, the concentration of cross-links in the polymer is considerably less than the concentration of the cross-linking agent in the original mixture.

It is thus seen that the straightforward suspension copolymerization of styrene with a cross-linking agent leads to a highly heterogeneous polymer structure. This heterogeneity is undesirable in an ion-exchange resin for several reasons. First, it leads to strains in the polymer beads, resulting in low mechanical strength and a limited ability to resist osmotic shock. Second, it leads to a limited chemical resistance. The chemical resistance increases with the number of cross-links, so that although those parts of the molecule with a large number of cross-links have adequate chemical resistance, those where the number is small are of low stability and indeed determine the overall stability of the ion-exchange resin. Third, the exchange characteristics of an ion-exchange resin are determined by the cross-linking, and a resin of heterogeneous cross-linking will show different exchange characteristics as it becomes progressively exhausted, i.e. as the ion-exchange occurs on sites situated in the various tightly and loosely cross-linked areas of the resin molecule.

The greater the homogeneity of a copolymer, that is to say the more even the spacing of the cross-links throughout the molecule, the greater are the chemical stability and mechanical stability of an ion-exchange resin produced from the copolymer, and the more uniform are its exchange characteristics. Our object in this invention is to increase the homogeneity of copolymer beads.

In bulk or emulsion polymerization a technique employed when two monomers are of unequal reactivity involves the progressive addition of the more reactive monomer in order to maintain the unpolymerized monomer mixture substantially constant in composition. When, however, the polymerization is effected with the monomers in suspension, it has not hitherto been possible to make use of this technique. The reason is that an essential feature of suspension polymerization is that the monomer mixture is stirred into a suspension medium containing a suspension stabilizer which coats the monomer globules and prevents their coalescence when they collide. This medium is generally aqueous and most frequently is water itself, but sometimes is a salt solution. The stabilizer may be either a soluble colloid or surface-active agent, or an insoluble powder. Most stabilizers become degraded as the polymerization proceeds, and the common practice is to add so much stabilizer initially that there will be enough to prevent coalescence throughout the whole course of the process. The consequence is that throughout the greater part of the reaction the film of stabilizer is thick enough to prevent the freshly added monomer or monomers from entering the globules. When, therefore, the suspension is subjected to polymerization conditions, polymer and unreacted monomer mixture co-exist in the globules, but the proportions of the monomers in the unreacted mixture in the globules tend to change continuously. This is true whether there are only two monomers, one more reactive than the other, or whether there are more than two monomers of unequal reactivity.

This tendency of the proportions of the monomers in the unreacted mixture in the globules to change continuously is wholly or partially offset, according to the invention, by introducing additional more reactive monomer or monomers into the globules. This is done, despite the presence of the films of stabilizer around the globules, by continuously or intermittently adding the additional monomer or monomers in aqueous emulsion form, and, so long as emulsified monomer or monomers are present in the suspension, ensuring that although the amount of stabilizer present is enough to prevent the polymerizing globules from coalescing it is not so great as to prevent penetration of them by the emulsified monomer mixture. It is surprisingly found that when the addition is made in the form of an aqueous emulsion the emulsified monomers will penetrate the barriers constituted by thin stabilizer films, whereas if a mere mixture of the monomers is added the desired result is not obtained; rather, fresh droplets tend to form, and any mixture that does penetrate the barriers does so unevenly.

There are various ways of ensuring that the barrier film of stabilizer is thin. In one way the proportion of suspension stabilizer in the initial suspension is made lower than usual, so that only films penetratable by the emulsified monomer or mixture are formed. On proceeding in this way, the emulsified monomer or mixture can be added from the beginning of the polymerization, and to take account of the degradation of the stabilizer and yet to maintain the same type of film, further stabilizer is added as the polymerization proceeds. In a modification of this method, polymerization may be allowed to take place for a little while before any emulsion is added.

Another way of producing thin barrier films makes use of the fact that the polymerization and degradation of the stabilizer proceed at different relative rates at different temperatures. Under appropriate conditions, the rate of polymerization will be less in proportion than that of degradation of the stabilizer. Accordingly, the initial proportion of stabilizer may be so high as to form films which even the emulsified monomer or mixture will not penetrate, and possibly may be the conventional proportion, and the polymerization may then be carried on under conditions, for example, a relatively low temperature, which cause the films to become thin enough to be penetrated by the minute droplets of the emulsified monomer or monomers. At this stage the addition of the emulsion mixture can begin, and the temperature can be kept constant, raised or lowered, the only criterion being that the polymerization should proceed at some convenient rate. Naturally, small quantities of fresh stabilizer must be added at intervals to compensate for the continued and inevitable further degradation of stabilizer as polymerization proceeds.

To determine when the emulsion can be added is essentially an empirical matter. A small sample of the suspension may be taken, a little emulsion added to it and the result observed under a microscope. Of course, when appropriate times for the additions of emulsion and stabilizer have thus been determined in the polymerization of one batch of monomers, a programme can be laid down for further batches.

Towards the end of the polymerization the presence of any stabilizer films on the globules is relatively unimportant, since then they cease to be sticky and have little tendency to coalesce.

Improvement in the homogeneity is brought about by a single addition of emulsion, but preferably the addition is effected in a number of steps during the polymerization or even continuously. The best results are of course obtained if the proportion of the monomers in the mixture within the globules is kept constant at all times.

It will be understood that as fresh monomer is introduced into the globules, the polymer existing in them, which is in the form of a gel, swells. One consequence is that the globules increase in size, and therefore the final beads are larger than the initial globules. If beads of a specified size are desired, the initial condition should be such as to form globules smaller than this size.

The invention is particularly useful when the initial monomer mixture contains only two monomers, and in such a case it is preferred to introduce into the globules additional monomer mixture containing a greater proportion of the more reactive monomer than exists at the time in the unreacted mixture in the globules, a proportion which should increase progressively.

In all polymerization reactions a catalyst is normally dissolved in the original monomer mixture. In the invention it is unnecessary for the added monomer or mixture to contain any catalyst and, indeed, it is preferable that it should not.

Thus the preferred processes according to the invention involve the continuous or intermittent addition of an emulsified monomer mixture which must vary in composition as the polymerization proceeds. If this is added continuously, its composition may be changed continuously or in steps. A method of changing it continuously is to form an emulsified mixture of monomers in a vessel, to discharge this mixture into the polymerization vessel, and throughout the process to add an emulsion of the more reactive monomer, or a monomer mixture containing a higher proportion of the more reactive monomer, to the emulsified mixture. Alternatively, of course, both the discharge of the emulsified mixture and the addition of emulsion to it can be effected in steps. Again, if the emulsified monomer mixture is to be added intermittently, batches of the required composition can be prepared.

The rate of addition of the emulsion may be varied relative to the rate of polymerization, itself dependent upon the temperature and the catalyst concentration, to result in a larger or smaller amount of unreacted monomer mixture within the polymerizing globule. This amount will affect the swelling properties of the final copolymer. The mechanical and osmotic strength and other characteristics of an ion-exchange resin produced from the copolymer are roughly related to its swelling properties. If a resin swells too much, the volume of a bed of it is high in relation to its exchange properties; if it is too tightly cross-linked and swells too little, the exchange capacity is reduced.

It is found that by means of the invention ion-exchange resin beads having similar swelling properties to those of conventional beads can be produced with smaller amounts of cross-linking agent, and in view of the relative prices of, in particular, styrene and divinyl benzene this is a considerable advantage.

Either the monomer mixture forming the original globules, or that added in emulsion, or both, may be dissolved in an organic solvent, this solvent being either of the type that swells the finished copolymer or of the type that precipitates it. In this way, a molecularly homogeneous macroporous or macroreticular copolymer can be produced.

The invention is applicable not only to the production of other cross-linked copolymers, for example of styrene with other cross-linking agents such as ethylene glycol dimethacrylate and of ethyl acrylate and divinyl benzene, but also to the production of linear non-cross-linked copolymers, each component of the monomer mixture having only one double bond. The composition of the added monomer mixture must be varied in the direction that it contains progressively more of the more reactive monomer as the addition and polymerization proceed. Examples of such linear copolymers are those of styrene and acrylonitrile, styrene and butadiene, vinyl acetate and vinyl chloride, vinyl chloride and acrylonitrile, vinyl chloride and butadiene, acrylonitrile and butadiene, and methyl methacrylate and methacrylic acid.

Some examples will now be given.

EXAMPLE 1

The object was to produce beads of a copolymer of styrene and divinyl benzene (DVB) containing 5.4% DVB, and of much greater homogeneity than conventional beads produced from these monomers. The DVB was used as a concentrate containing 55% divinyl benzene, and the total volume of this concentrate and the styrene was 300 ml.

The volume of the initial mixture of monomers was 60 ml., and it was composed of 3.28 ml. and 56.72 ml. styrene. This mixture and 3 gm. benzoyl peroxide were stirred into 227 ml. water containing 0.5 gm. polyvinyl alcohol (Gohsenol GH–16R) as the stabliizer to form droplets of 200–300$\mu$ particle size. The initial DVB concentration was thus 3%, and the initial proportion of the stabilizer about 0.2% w./v. of the water. The suspension was then polymerized at 73° C. for 2 hours, and at the end of this time 40% of the monomers had been converted to polymer. The polymer so formed amounted to 8% of the total to be formed. At this stage the concentration of DVB in the unreacted mixture in the globules was 1.5%, as against the initial 3%.

In the meantime two emulsions of monomer mixture in water of 5–10$\mu$ particle size and of the following compositions were prepared:

(1) 120 ml. monomer mixture composed of 8.75 ml. DVB concentrate and 111.25 ml. styrene, containing an oil-soluble emulsifying agent (0.5 g. Colorol 30—modified phosphoaminolipid fractions) was emulsified in 160 ml. water containing a water-soluble surface-active agent (0.5 ml. of a 1:40 solution of Teepol in water).

(2) 120 ml. monomer mixture composed of 17.50 ml. DVB concentrate and 102.05 ml. styrene, containing 0.5 g. Colorol 30 was emulsified in 160 ml. water containing 0.5 ml. of the Teepol solution.

In the first of these emulsions the DVB concentration is about 4% and in the second about 8%.

These emulsions were then added in drops to the suspension of partially polymerized beads. The object was to maintain at 5.4% the instantaneous concentration of the DVB in the polymer bead, that is to say, the concentration in the polymer formed at any given instant. Because of the greater reactivity of DVB, the corresponding concentration of DVB in the unreacted monomers in the globule would be 2.80%, but immediately before the addition of any emulsion the DVB concentration had fallen to 1.5% as explaised above. Only the first emulsion was initially added, as the 4% DVB in it was enough. The addition of emulsion, however, led not only to increase in the volume of each globule but also to increase in the volume of unreacted monomer in each globule. Therefore, as the polymerization proceeded, an increasing proportion of DVB was required in the added emulsion to ensure the desired proportion of about 2.8% in the unreacted monomer in each globule. Accordingly the two emulsions were blended to give an addition in which the proportion of DVB gradually and uniformly increased until it reached 8% before the completion of the polymerization.

During the polymerization, all of which was effected at 73° C., fresh stabilizer in an amount of 0.02 g. polyvinyl alcohol (as 5 ml. of a 1% solution of polyvinyl alcohol in water) was added at hourly intervals, each such addition thus being about 4% of the original amount.

The table below shows the percentage conversion of the total mount (300 ml.) of monomers, that is to say the proportion of the final polymer already produced, at various times. It also shows three DVB concentrations, namely that in the emulsion added at each of the times given, that in the unreacted monomers in the beads at the times given, and the instantaneous concentration in the polymer that is being formed at the times given. In addition, the table also shows, by way of comparison, the instantaneous DVB concentration in polymer beads produced in the conventional way from a mixture of styrene and 8.6% DVB with an amount of stabilizer equal to 0.2% w./v.

In order to impart cation-exchange properties 20 g. of the resin in bead form were swollen in 1,2-dichloroethane and 90 ml. of concentrated sulphuric acid were added, and the mixture was heated for 16 hours at 90° C. The product was filtered and washed with water. The sulphonated ion-exchange resin thus obtained had a capacity of 5.15 meq./g. and its swelling in water was 1.12 g. water per g. of dry H+-form resin. The conventional beads when similarly sulphonated have a capacity of 5.15 meq./g. and their swelling in water is about 1.0 g. water per g. of dry H+-form resin. It is, of course, the swelling properties of the final resin which are important, and it will be seen that those of the resin with 5.4% DVB made according to the invention are very similar to those of the conventional resin with 8.6% DVB.

EXAMPLE 2

The copolymer beads were prepared in accordance with the method described in Example 1 except that ethylene glycol dimethacrylate (EDMA) was used as cross-linking agent.

The volume of the initial mixture of monomers was 60 ml., and it was composed of 0.75 ml. EDMA (Sartomer SR206) and 59.25 ml. styrene. This mixture and 3 g. benzoyl peroxide were stirred into 227 ml. water containing 0.5 polyvinyl alcohol (0.2% w./v.) to form droplets of 200–300μ particle size. The initial EDMA concentration was thus 1.25%. The suspension was then polymerized at 83° C. for 50 minutes, at which time 40% of the monomers had been converted to polymer. The polymer formed amounted to 8% of the total to be formed. At this stage the concentration of EDMA in the unreacted mixture in the globules was 0.35%.

In the meantime two emulsions of monomer mixture in water of 5–10μ particle size and of the following compositions were prepared:

(1) 120 ml. monomer mixture composed of 1.80 ml. EDMA and 118.20 ml. styrene containing an oil-soluble emulsifying agent (0.5 g. Colorol 30) was emulsified in 160 ml. water containing a water-soluble surface-active agent (0.5 ml. of a 1:40 solution of Teepol in water).

(2) 120 ml. monomer mixture composed of 5.4 ml. EDMA and 114.6 ml. styrene, containing 0.5 g. Colorol 30 was emulsified in 160 ml. water containing 0.5 ml. of the Teepol solution.

TABLE 1

|  | Reaction time, minutes | Proportion of final polymer produced, percent | DVB in added emulsion, percent | DVB in unreacted monomer in beads, percent | DVB in instantaneous polymer, percent | DVB in instantaneous polymer in DVB, conventional process 8.6% DVB, percent |
|---|---|---|---|---|---|---|
| 1st polymerization | 0 | 0 |  | 3.00 | 6.00 | 29.00 |
|  | 120 | 8 |  | 1.50 | 2.80 | 22.00 |
| Addition of emulsion | 120 | 8 | 4.0 |  |  |  |
|  | 130 | 10 | 4.0 | 23.0 | 4.50 | 21.00 |
|  | 160 | 16 | 4.5 |  |  |  |
|  | 170 | 18 | 4.5 | 3.50 | 7.60 | 17.00 |
|  | 220 | 23 | 5.5 |  |  |  |
|  | 235 | 25 | 5.5 | 3.30 | 7.0 | 14.00 |
|  | 310 | 39 | 6.5 |  |  |  |
|  | 320 | 42 | 6.5 | 3.70 | 8.20 | 9.00 |
|  | 350 | 52 | 6.8 |  |  |  |
|  | 370 | 58 | 6.8 | 3.50 | 7.60 | 6.00 |
|  | 430 | 81 | 7.5 |  |  |  |
|  | 440 | 82 | 7.5 | 2.50 | 4.70 | 2.30 |
|  | 490 | 90 | 8.0 |  |  |  |
|  | 510 | 91 | 8.0 | 4.50 | 9.70 | 1.00 |
|  | 570 | 96 | 8.0 |  |  |  |
| Final polymerization | 570 | 96 |  | 2.40 | 4.50 | 0.70 |
|  | 650 | 100 |  | 1.30 | 2.40 | 0.50 |

The solid polymer beads produced as described in the example were separated from the aqueous phase, washed with water, dried and sieved between 18 and 60 B.S. mesh sieves. The yield of perfect, transparent beads in this size range was 65%. The swelling of these beads in toluene was 0.49 g. toluene per g. dry resin. The swelling of the beads conventionally made was 0.7 g. toluene per g. dry resin.

In the first of these emulsions the EDMA concentration is about 1.5% and in the second about 4.5%.

These emulsions were then added slowly and continuously to the suspension of partially polymerised beads. The object was to maintain at 2.86% the average concentration of the EDMA in the polymer bead. Because of the greater reactivity of EDMA, the corresponding concentration of EDMA in the unreacted monomers in the bead is 0.80% but immediately before the addition of any emulsion the EDMA concentration had fallen to 0.35% as explained above.

The first emulsion only was initially added as 1.5% EDMA solution and then the two emulsions were blended to give an addition in which the proportion of EDMA gradually and uniformly increased until it reached 4.5% before the completion of polymerization.

During the emulsion addition, the temperature was kept at 83° C. and 0.032 g. fresh stabilizer (as 8 ml. of 1% solution of polyvinyl alcohol in water) was added at hourly intervals.

The table below shows the percentage conversion, and (similarly to Table 1) the three EDMA concentrations, and by way of comparison, the instantaneous EDMA concentration in polymer beads produced in the conventional way from a mixture of styrene and 3.57% EDMA in suspension with 0.2% w./v. stabilizer.

thus 7.00%. The suspension was then polymerized at 67° C. for 70 minutes at which time 50% of the monomers had been converted to polymer. The polymer so formed amounted to 10% of the total to be formed. At this stage the concentration of acrylonitrile in the unreacted mixture in the globules was 3.30%.

In the meantime two emulsions of monomer mixture in water of 5–10μ particle size and of the following composition were prepared:

(1) 120 ml. monomer mixture composed of 6 ml. acrylonitrile and 114 ml. styrene containing an oil-soluble emulsifying agent (0.5 g. Colorol 30) was emulsified in 160 ml. water containing a water-soluble surface-active agent (2.5 ml. of 1:40 solution of Teepol in water).

(2) 120 ml. monomer mixture composed of 18 ml. acrylonitrile and 102 ml. styrene, containing 0.5 g. Colorol 30 was emulsified in 160 ml. water containing 2.5 ml. of the Teepol solution. In the first of these emulsions

TABLE 2

| | Reaction time, minutes | Proportion of final polymer produced, percent | EDMA in added emulsion, percent | EDMA in unreacted monomer in beads, percent | EDMA in instantaneous polymer, percent | EDMA in instantaneous polymer in conventional process 3.57% EDMA, percent |
|---|---|---|---|---|---|---|
| 1st polymerization | 0 | 0 | | 1.25 | 4.50 | 12.50 |
| | 50 | 8 | | 0.35 | 1.35 | 10.00 |
| Addition of emulsion | 50 | 8 | 1.5 | | | |
| | 60 | 11 | 1.5 | 0.80 | 2.80 | 9.30 |
| | 100 | 19 | 2.0 | | | |
| | 115 | 21 | 2.0 | 0.92 | 3.20 | 6.80 |
| | 150 | 28 | 2.5 | | | |
| | 163 | 30 | 2.5 | 0.76 | 2.70 | 5.10 |
| | 200 | 37 | 3.0 | | | |
| | 21 | 38 | 3.0 | 0.70 | 2.50 | 4.40 |
| | 300 | 55 | 3.5 | | | |
| | 308 | 56 | 3.5 | 0.85 | 3.00 | 1.80 |
| | 400 | 74 | 4.0 | | | |
| | 412 | 75 | 4.0 | 0.87 | 3.10 | 0.15 |
| | 500 | 85 | 4.5 | | | |
| | 510 | 86 | 4.5 | 0.72 | 2.60 | 0 |
| | 600 | 92 | 4.5 | | | |
| Final polymerization | 600 | 92 | | 0.75 | 2.80 | 0 |
| | 800 | 100 | | 0 | 0 | 0 |

The solid polymer beads produced as described were separated from the aqueous phase, washed with water, dried and sieved between 18 and 60 B.S. mesh sieves. The yield of perfect, transparent beads in this size range was 71%. The swelling of the beads in toluene was 1.02 g. toluene per g. dry resin.

In order to impart anion-exchange properties, 50 g. of the resin in bead form were swollen in 200 ml. ethylene dichloride and 110 ml. of chloromethyl ether in which 30 g. of anhydrous aluminum chloride was dissolved, was added and the resulting mixture was heated for 14 hours at 65° C. The chloromethylated beads were then filtered and washed with water. Then 100 ml. 30% w./w. trimethylamine solution in water was added and the beads were left at room temperature for 16 hours. The product was filtered and washed with water. The strongly basic anion-exchange resin thus obtained had a capacity of 4.10 meq./g. and its swelling in water was 1.08 g. water per g. of dry Cl⁻-form resin, that of the conventionally made resin being 1.2 g. water.

EXAMPLE 3

This is an example of the preparation of a styrene-acrylonitrile linear bead copolymer of an average acrylonitrile content of 9.70%.

The volume of the initial mixture of monomers was 60 ml. and it was composed of 4.2 ml. acrylonitrile and 55.8 ml. styrene. This mixture and 4.5 g. azodiisobutyronitrile were stirred into 227 ml. water containing 0.08% w./v. polyvinyl alcohol to form droplets of 200–300μ particle size. The initial acrylonitrile concentration was the acrylonitrile concentration is about 5% and in the second about 15%.

These emulsions were then added slowly and continuously to the suspension of partially polymerized beads. The object was to maintain at 9.70% the average concentration of the acrylonitrile; the corresponding concentration of acrylonitrile in the unreacted monomers in the beads is 4.35% but immediately before the addition of any emulsion the acrylonitrile concentration had fallen to 3.3%.

As in Example 2 the first emulsion only was initially added as 5% acrylonitrile solution and then the two emulsions were blended to give an addition in which the proportion of acrylonitrile was gradually and uniformly increased until it reached 15% before the completion of polymerization.

During the emulsion addition the temperature was kept at 67° C. and 0.012% fresh stabilizer (as 3 ml. of a 1% solution of polyvinyl alcohol) was added at hourly intervals.

Table 3 shows the percentage conversion, and the three acrylonitrile concentrations. The table also shows, by way of comparison, the instantaneous acrylonitrile concentration in polymer beads produced in the conventional way from a mixture of styrene and 10% acrylonitrile with 0.08% w./v. stabilizer.

The solid polymer beads produced as described were separated from the aqueous phase, washed with water and dried at 55° C. The yield of perfect, transparent beads was 87%.

TABLE 3

| | Reaction time, minutes | Proportion of final polymer produced, percent | Acrylonitrile in added emulsion, percent | Acrylonitrile in unreacted monomer in beads, percent | Acrylonitrile in instantaneous polymer, percent | Acrylonitrile in instantaneous polymer in conventional process 10% acrylonitrile, percent |
|---|---|---|---|---|---|---|
| 1st polymerization | 0 | 0 | | 7.00 | 11.20 | 15.30 |
| | 70 | 10 | | 3.30 | 6.50 | 14.50 |
| Addition of emulsion | 70 | 10 | 5.00 | | | |
| | 80 | 11.5 | 5.00 | 4.00 | 9.20 | 13.90 |
| | 120 | 20 | 7.00 | | | |
| | 130 | 23 | 7.00 | 5.20 | 10.75 | 13.00 |
| | 170 | 34 | 9.00 | | | |
| | 185 | 38 | 9.00 | 5.80 | 11.55 | 10.75 |
| | 240 | 54 | 11.00 | | | |
| | 250 | 57 | 11.00 | 4.60 | 10.00 | 7.50 |
| | 300 | 76 | 13.00 | | | |
| | 310 | 80 | 13.00 | 6.20 | 12.00 | 7.00 |
| | 360 | 91 | 15.00 | | | |
| | 380 | 93 | 15.00 | 6.40 | 12.30 | 2.10 |
| | 440 | 97 | 15.00 | | | |
| Final polymerization | 440 | 97 | | 5.80 | 11.55 | 1.30 |
| | 600 | 100 | | 3.50 | 8.20 | 0.85 |

EXAMPLE 4

This is an example of the preparation of a methyl methacrylate-methacrylic acid (MA) linear bead copolymer of an average methacrylic acid content of 4.85%.

The volume of the original mixture of the monomers was 60 ml. and it was composed of 1.5 ml. methacrylic acid and 58.5 ml. methyl methacrylate. This mixture and 3.5 g. benzoyl peroxide were stirred into 227 ml. water containing 0.02% w./v. hydroxyethyl cellulose (Natrosol 250M) (as stabilizer) to form droplets of 200–300μ particle size. The initial methacrylic acid concentration was thus 2.50%. The suspension was then polymerized at 80° C. for 40 minutes at which time 30% of the monomers had been converted to polymer. The polymer so formed amounted to 6% of the total to be formed. At this stage the concentration of methacrylic acid in the unreacted mixture in the globules was 0.84%.

In the meantime two emulsions of monomer mixture in water of 5–10μ particle size and of the following composition were prepared:

(1) 120 ml. monomer mixture composed of 2.4 ml. methacrylic acid and 117.6 ml. methyl methacrylate containing 0.5 g. Ethylan 77 (oil-soluble nonyl phenol ethylene oxide condensate) was emulsified in 160 ml. water containing 0.1 g. Ethylan BCP (water-soluble nonyl phenol ethylene oxide condensate).

(2) 120 ml. monomer mixture composed of 9.6 ml. methacrylic acid and 110.4 ml. methyl methacrylate containing 0.5 g. Ethylan 77 was emulsified in 160 ml. water containing 0.1 g. Ethylan BCP.

In the first of these emulsions the methacrylic acid concentration is about 2%, in the second about 8%.

These emulsions were then added slowly and continuously to the suspension of partially polymerized beads. The object was to maintain at 4.85% the average concentration of the methacrylic acid in the polymer bead. Because of the greater reactivity of methacrylic acid, the corresponding concentration of methacrylic acid in the unreacted monomer in the bead is 1.15%, but immediately before the addition of any emulsion the methacrylic acid concentration had fallen to 0.84%.

As in previous examples the first emulsion only was initially added as 2% methacrylic acid solution and then the two emulsions were blended to give an addition in which the proportion of methacrylic acid was gradually and uniformly increased until it reached 8% before the completion of polymerization.

During the emulsion addition the temperature was kept at 80° C. and 0.01% w./v. fresh stabilizer (as 1 ml. of a 1% solution of hydroxyethyl cellulose) was added at hourly intervals.

Table 4 below shows the percentage conversion, the three methacrylic acid concentrations, and, by way of comparison, the instantaneous methacrylic acid concentration in polymer beads produced in the conventional way from a mixture of methyl methacrylate and 5% methacrylic acid with 0.1% w./v. hydroxyethyl cellulose as stabilizer.

TABLE 4

| | Reaction time, minutes | Proportion of final polymer produced, percent | MA in added emulsion, percent | MA in unreacted monomer in beads, percent | MA in instantaneous polymer, percent | MA in instantaneous polymer in conventional, 15% MA, percent |
|---|---|---|---|---|---|---|
| 1st polymerization | 0 | 0 | | 2.50 | 9.50 | 16.50 |
| | 40 | 6 | | 0.84 | 3.50 | 14.00 |
| Addition of emulsion | 40 | 6 | 2.0 | | | |
| | 50 | 9 | 2.0 | 1.20 | 5.00 | 12.50 |
| | 80 | 21 | 3.0 | | | |
| | 90 | 24 | 3.0 | 1.50 | 6.00 | 9.00 |
| | 130 | 39 | 4.0 | | | |
| | 135 | 41 | 4.0 | 1.75 | 6.90 | 4.00 |
| | 160 | 53 | 5.0 | | | |
| | 170 | 58 | 5.0 | 1.35 | 5.50 | 1.50 |
| | 190 | 70 | 6.0 | | | |
| | 195 | 72 | 6.0 | 1.45 | 5.90 | 0.70 |
| | 250 | 86 | 7.0 | | | |
| | 260 | 87 | 7.0 | 1.40 | 5.60 | 0.32 |
| | 320 | 93 | 8.0 | | | |
| | 340 | 94 | 8.0 | 1.65 | 6.30 | 0.25 |
| | 400 | 97 | 8.0 | | | |
| Final polymerization | 400 | 97 | | 1.90 | 7.50 | 0.19 |
| | 550 | 100 | | 0.95 | 3.70 | 0.07 |

The solid polymer beads produced as described were separated from the aqueous phase, washed with water and dried at 65° C. The yield of perfect, transparent beads was 86%.

EXAMPLE 5

This is a variation of Example 1 in which the stabilizer films are initially thin and the emulsion is added from the beginning of the polymerization. The mixture of monomers and benzoyl peroxide was stirred into 227 ml. water containing 0.20 g. polyvinyl alcohol (0.08% w./v.) as the stabilizer. After the suspension had been brought up to the temperature of 73° C., an emulsion containing the same proportion of the two monomers was immediately added prior to any conversion to polymer.

Table 5 shows the progress of the polymerization.

TABLE 5

|  | Reaction time, minutes | Proportion of final polymer produced, percent | DVB in added emulsion, percent | DVB in unreacted monomer in beads, percent | DVB in instantaneous polymer, percent |
|---|---|---|---|---|---|
| Addition of emulsion | 0 | 0 | 4.0 | 3.00 | 6.00 |
|  | 100 | 5 | 4.5 |  |  |
|  | 110 | 6 | 4.5 | 2.80 | 5.80 |
|  | 160 | 13 | 5.5 |  |  |
|  | 170 | 15 | 5.5 | 3.10 | 6.40 |
|  | 210 | 21 | 6.5 |  |  |
|  | 220 | 25 | 6.5 | 3.60 | 7.90 |
|  | 280 | 36 | 7.0 |  |  |
|  | 290 | 39 | 7.0 | 3.20 | 6.70 |
|  | 380 | 61 | 7.5 |  |  |
|  | 395 | 64 | 7.5 | 3.30 | 7.00 |
|  | 450 | 82 | 8.0 |  |  |
|  | 460 | 83 | 8.0 | 3.50 | 7.60 |
|  | 520 | 90 | 8.0 |  |  |
| Final polymerization | 520 | 90 |  | 3.60 | 7.90 |
|  | 620 | 100 |  | 2.50 | 4.70 |

EXAMPLE 6

This is an example of the effect of temperature. The process was the same as in Example 1 except that the temperature was increased to 80° prior to the emulsion addition, and this temperature was kept at 80° during the whole time to the end of polymerization. Fresh stabilizer in an amount of 8 ml. of 1% solution of polyvinyl alcohol in water was added at 40 minute intervals.

Table 6 shows the progress of the polymerization.

TABLE 6

|  | Reaction time, minutes | Proportion of final polymer produced, percent | DVB in added emulsion, percent | DVB in unreacted monomer in beads, percent | DVB in instantaneous polymer, percent |
|---|---|---|---|---|---|
| 1st polymerization | 0 | 0 |  | 3.00 | 6.00 |
|  | 120 | 8 |  | 1.50 | 2.80 |
| Addition of emulsion | 120 | 8 | 4.0 |  |  |
|  | 130 | 10 | 4.0 | 2.40 | 4.80 |
|  | 150 | 17 | 4.5 |  |  |
|  | 160 | 19 | 4.5 | 3.30 | 7.00 |
|  | 200 | 24 | 5.5 |  |  |
|  | 210 | 26 | 5.5 | 3.50 | 7.60 |
|  | 250 | 44 | 6.5 |  |  |
|  | 260 | 51 | 6.5 | 3.70 | 8.20 |
|  | 290 | 74 | 7.5 |  |  |
|  | 300 | 79 | 7.5 | 3.40 | 7.20 |
|  | 370 | 91 | 8.0 |  |  |
|  | 380 | 92 | 8.0 | 3.90 | 8.50 |
|  | 420 | 95 | 8.0 |  |  |
| Final polymerization | 420 | 95 |  | 3.40 | 7.20 |
|  | 510 | 100 |  | 2.30 | 4.60 |

We claim:

1. In a process for suspension copolymerization of a mixture of at least two unsaturated copolymerizable monomers which comprises forming an initial suspension of globules of the monomer mixture in an aqueous medium containing stabilizer for the globules and subjecting the suspension to copolymerization conditions whereby copolymer is formed in the globules, in which process the mixture comprises monomers which copolymerize at different rates in the process, a monomer feed at least comprising the faster reacting monomer is added to the suspension during the polymerization to replace faster reacting monomer that has copolymerized and the amount of stabilizer is maintained such that, throughout the process, the globules do not coalesce and the added monomer feed penetrates the globules, the improvement comprising adding the added monomer feed in aqueous emulsion form.

2. A process according to claim 1 in which the proportion of the more reactive monomer in the added emulsion is progressively increased as the polymerization proceeds.

3. A process according to claim 1 in which the proportion of stabilizer in the initial suspension is made so low that only films penetratable by the emulsified mixture are formed, and further stabilizer is added as the polymerization proceeds.

4. A process according to claim 1 in which so much stabilizer is introduced into the initial mixture as to form barriers to the entry of emulsified monomer mixture, the stabilizer is degraded by effecting the polymerization without any addition of emulsion until films penetratable by the emulsified monomer mixture are formed, and the emulsion is then added, further stabilizer being added as the polymerization proceeds.

5. A process according to claim 1 in which the addition of emulsion is made by forming an emulsified monomer mixture, and discharging this mixture into the suspension, and as the discharge proceeds adding a second emulsion of greater reactive monomer content to said emulsified mixture.

6. A process for the suspension polymerization of a mixture of at least two unequally reactive unsaturated monomers selected from the group consisting of styrene and divinyl benzene, styrene and ethylene glycol dimethacrylate, styrene and acrylonitrile and methyl methacrylate and methacrylic acid in an aqueous suspension medium containing a stabilizer for globules of the monomer mixture which comprises forming an initial suspension of such globules, subjecting this suspension to polymerization conditions whereby polymer and unreactive monomer mixture co-exist in the globules but the proportion of the monomers in the unreacted mixture in the globules tends to change continuously, subsequently adding the more reactive monomer of said monomer mixture in aqueous emulsion form, the reaction medium retaining the character of a suspension subsequent to said addition, and so long as emulsified monomer is present in the suspension controlling the amount of stabilizer present at a value enough to prevent the polymerizing globules from coalescing but not so great as to prevent penetration of them by emulsified monomer.

7. The process of claim 6 wherein the proportion of the more reactive monomer in the unreacted mixture tends to decrease continuously, and at least partially offsetting this tendency by introducing into the globules in aqueous emulsion form additional monomer mixture containing a proportion of the more reactive monomer than exists at the time in the unreacted mixture in the globules.

8. A process for the suspension polymerization of a mixture of two unequally reactive unsaturated monomers in a suspension medium containing a stabilizer for globules of the monomer mixture which comprises forming an initial aqueous suspension of monomer globules, subjecting this suspension to polymerization conditions to produce globules in which polymer and unreacted monomer mixture co-exist, but the proportion of the more reactive monomer in the unreacted mixture tends to decrease continuously, and at least partially offsetting this tendency by introducing into the globules additional monomer mixture containing a greater proportion of the more reactive monomer than exists at the time in the unreacted mixture in the globules, the introduction being effected by adding the additional mixture in emulsion form as the polymerization proceeds, and, so long as emulsified monomer mixture is present in the suspension, controlling the amount of stabilizer present at a value enough to prevent the polymerizing globules from coalescing but not so great as to prevent penetration of them by the emulsified monomer mixture.

9. A process for the suspension polymerization of a monomer mixture of styrene and divinylbenzene in a suspension medium containing a stabilizer for globules of the monomer mixture which comprises forming an initial aqueous suspension of monomer globules, subjecting this suspension to polymerization conditions to produce globules in which polymer and unreacted monomer mixture co-exist, but the proportion of the more reactive monomer in the unreacted mixture tends to decrease continuously, and at least partially offsetting this tendency by introducing into the globules additional monomer mixture containing a greater proportion of the more reactive monomer than exists at the time in the unreacted mixture in the globules, the introduction being effected by adding the additional mixture in emulsion form as the polymerization proceeds, and, so long as emulsified monomer mixture is present in the suspension, controlling the amount of stabilizer present at a value enough to prevent the polymerizing globules from coalescing but not so great as to prevent penetration of them by the emulsified monomer mixture.

References Cited

UNITED STATES PATENTS

| | | | |
|---|---|---|---|
| 2,482,711 | 9/1949 | Heeremd | 260—87.5 |
| 2,668,806 | 2/1954 | Howard | 260—45.5 |
| 2,712,536 | 7/1955 | Winslow | 200—45.5 |

OTHER REFERENCES

Billmeyer, Fred W., Jr.: Interscience Publ. Inc., N.Y., Textbook of Polymer Chemistry, pp. 236–239 (1957).

Ming, G.: Jour. of Polymer Science, vol. XXII, December 1956 pp. 369–381, Copolymerization of Styrene+ Acrylonitrile in Aqueous Dispersion.

Polymer Processes, ed. by C. E. Schildknecht (1956) pp. 75–85, 101, 107, Interscience Publ.

JOSEPH L. SCHOFER, Primary Examiner

F. J. SMITH, Assistant Examiner

U.S. Cl. X.R.

260—82.1, 82.3, 83.7, 85.5 HC, 85.5 XA, 85.5 P, 86.1 R, 86.7, 87.1, 95 R